(12) United States Patent
Flena et al.

(10) Patent No.: US 11,063,416 B2
(45) Date of Patent: Jul. 13, 2021

(54) CLAMP FOR A WIRE OF AN OVERHEAD LINE AND METHOD FOR TIGHTENING A WIRE OF AN OVERHEAD LINE

(71) Applicant: ALSTOM Transport Technologies, Saint-Ouen (FR)

(72) Inventors: Daniele Flena, Dolzago (IT); Felice Bassani, Albavilla (IT); Andrea Perego, Monza (IT); Claudio Binda, Ballabio (IT)

(73) Assignee: ALSTOM Transport Technologies, Saint-Ouen (FR)

( * ) Notice: Subject to any disclaimer, the term of this patent is extended or adjusted under 35 U.S.C. 154(b) by 0 days.

(21) Appl. No.: 16/531,479

(22) Filed: Aug. 5, 2019

(65) Prior Publication Data

US 2020/0044431 A1 Feb. 6, 2020

(30) Foreign Application Priority Data

Aug. 6, 2018 (EP) .................................. 18306083

(51) Int. Cl.
*F16M 11/00* (2006.01)
*H02G 7/05* (2006.01)
*F16L 3/10* (2006.01)

(52) U.S. Cl.
CPC ............ *H02G 7/053* (2013.01); *F16L 3/1075* (2013.01)

(58) Field of Classification Search
CPC .......... H01R 4/52; H01R 4/5083; H02G 7/02; H02G 7/056
See application file for complete search history.

(56) References Cited

U.S. PATENT DOCUMENTS

| 4,428,100 A | 1/1984 | Apperson |
| 6,076,236 A | 6/2000 | Defrance |
| 6,817,909 B2 * | 11/2004 | Dobrinski ............... H01R 4/52 439/783 |
| 7,304,243 B2 * | 12/2007 | Polidori ................. H02G 7/053 174/84 C |

(Continued)

FOREIGN PATENT DOCUMENTS

| KR | 20110008514 A | 1/2011 |
| KR | 20150090572 A | 8/2015 |

OTHER PUBLICATIONS

Cushion Grip: "Cushion Grip Suspension", Oct. 18, 2017, XP055539549, Retrieved from the Internet: URL:https://www.powertender.com/backbone/sp-content/uploads/2017/11/CGS-1110-PLP-Product-Sheet.pdf [retrieved on Jan. 9, 2019].

(Continued)

*Primary Examiner* — Amy J. Sterling
(74) *Attorney, Agent, or Firm* — Knobbe, Martens, Olson & Bear, LLP

(57) ABSTRACT

A clamp for a wire of an overhead line comprising a main body has a groove for hosting the wire, a first and a second tapered region located in respective ends of the groove, and a first and a second spring placed in respective holes on opposite sides of the groove. The first and second springs are located in a central portion of the groove and are arranged for pushing respective wedges into the tapered regions in opposite directions. The wedges are arranged for tightening the wire by blocking between the wire itself and a wall of the respective first and second tapered region.

11 Claims, 6 Drawing Sheets

(56) References Cited

U.S. PATENT DOCUMENTS

| | | |
|---|---|---|
| 9,780,548 B1 | 10/2017 | Kranz |
| 9,929,555 B2 * | 3/2018 | Shibilia .................... H02G 7/02 |
| 10,649,169 B2 * | 5/2020 | Al Ghossein ........ G02B 6/4471 |
| 2002/0142674 A1 * | 10/2002 | Chadbourne ........ H01R 4/5083 |
| | | 439/783 |
| 2002/0173206 A1 | 11/2002 | Dobrinski et al. |

OTHER PUBLICATIONS

European Search Report for Application No. EP18306083, dated Feb. 5, 2019 in 5 pages.
Extended European Search Report for Application No. EP180306083, dated Feb. 14, 2019 in 7 pages.

* cited by examiner

CLAMP FOR A WIRE OF AN OVERHEAD LINE AND METHOD FOR TIGHTENING A WIRE OF AN OVERHEAD LINE

CROSS-REFERENCE TO RELATED APPLICATION

This application claims priority to European Patent Application No. 18306083.9 filed on Aug. 6, 2018, the disclosure of which including the specification, the drawings, and the claims is hereby incorporated by reference in its entirety.

FIELD OF THE INVENTION

The present invention relates to a clamp for a wire, notably a messenger wire of an overhead line and to a method for tightening a messenger wire of an overhead line.

BACKGROUND OF THE INVENTION

An overhead line or overhead wire is commonly used to transmit electrical energy to trams or trains. The main component of such overhead line is a support and electric power supply cable, or messenger wire, which is fixed through clamps to a plurality of cantilevers of a metallic support structure of the overhead line. The messenger wire is in turn connected, through commonly known droppers, to a contact wire, on which a pantograph is pressed, in a manner known per se, to collect current from the overhead line for supplying the trains or trams.

Nowadays, several different types of clamps are available on the market. Clamps with one or two screws are widely used to lock the messenger wire which is hosted in a groove of the clamp itself, but the process of tightening the screws is long and requires around 50% of the installation time.

Other different types of clamps are known, respectively:
clamps which do not require screws, but which comprise more than one component;
clamps obtained by single metallic sheet, cut and bent, but including a screw to lock the wire into the clamp;
clamps similar to a clothespin, with an elastic element, and comprising more than one component.

The main disadvantage of all these clamps is that they either require multiple components or require screws, thus facilitating the possibility of losing components during the transportation to the site where the messenger wire has to be assembled, or making the installation phases complex.

For example, when using clamps with screws for locking the messenger wire in the groove, the operator need to go outside the cage used during the installation steps to put the wire inside the clamp, and then close it.

In particular, the operator firstly go up the cage and fix the messenger wire in a groove clamp, this operation being replicated for all the cantilevers of the overhead line. After that, the operator put the messenger wire under tension, and finally he comes back to every cantilever to tighten the screws.

The steps that the operator has therefore to perform are the followings:
installing the cantilevers on the structure of the overhead line;
inserting the messenger wire in all the clamps of all the cantilevers;
tensioning the messenger wire;
returning to each clamp and screwing it.

Sometimes it happens that the operator forgets some screws during the tightening phase, and he has to recover them from a storage which is usually located outside the cage, thus loosing time.

In any case, the time necessary to tight all the screws of the clamps amounts to about 40% of the total time necessary for installing the messenger wire on each cantilever of the overhead line, which usually amounts to 2-3 minutes.

There is therefore the need to have a clamp for a messenger wire of an overhead line which does not require screws for its assembly and which is easy to tighten, thus overcoming the limitations of the prior art solutions.

SUMMARY OF THE INVENTION

These and other objects are achieved by a clamp for a messenger wire of an overhead line having the characteristics defined in claim 1, and by a method for tightening a messenger wire of an overhead line having the characteristics defined in claim 11.

Preferred embodiments of the invention are the subject matter of the dependent claims, whose content is to be understood as forming an integral part of the present description.

BRIEF DESCRIPTION OF THE DRAWINGS

Further characteristics and advantages of the present invention will become apparent from the following description, provided merely by way of non-limiting example, with reference to the enclosed drawings, in which.

DETAILED DESCRIPTION OF THE PREFERRED EMBODIMENTS

Figure 1:
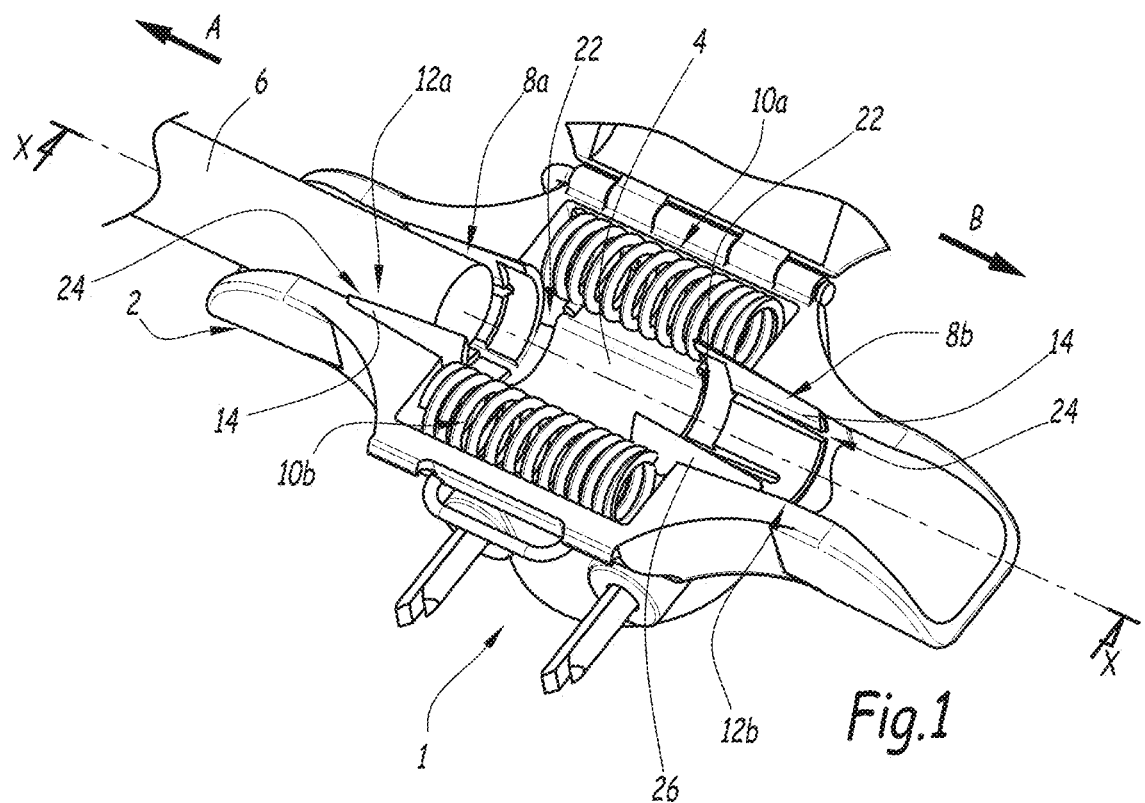
FIG. 1 shows a perspective top view of a clamp for a messenger wire 1 according to the present invention.

FIG. 1 shows a perspective top view of a clamp for a wire, notably a messenger wire 1 according to the present invention. It comprises a main body 2 having a groove 4 extending longitudinally along a longitudinal axis X for hosting a messenger wire 6. A first and a second wedges 8a, 8b are arranged for tightening the messenger wire 6 being pushed in opposite directions along said longitudinal axis X by respective first and second springs 10a, 10b, as detailed here below.

In FIG. 1 the messenger wire 6 is only partially inserted into the clamp 1, thus allowing a complete view of the wedges 8a, 8b.

The wedges 8a, 8b are placed in a respective first and second tapered regions 12a, 12b of the main body 2, said first and second tapered regions 12a, 12b being located in the groove 4, towards respective ends of the groove 4. The springs 10a, 10b are placed in respective holes on opposite sides of the groove 4, facing each other, said holes being located in a central portion of the groove 4.

Advantageously, the wedges 8a, 8b have a tapered shape complementary to the shape of a part of the corresponding tapered regions 12a, 12b in which they are received.

When the first wedge 8a is pushed in the first tapered region 12a, in a first direction A, by the associated first spring 10a, it tightens the messenger wire 6 because it is blocked between the messenger wire 6 itself and a wall of the first tapered region 12a. Similarly, when the second wedge 8b is pushed in the second tapered region 12b, in a second direction B opposite to the first direction A, by the associated second spring 10b, it tightens the messenger wire 6 because it is blocked between the messenger wire 6 itself and a wall of the second tapered region 12b.

If the messenger wire 6 further pulls each wedge 8a, 8b, due to its weight or due to tensioning forces exerted on the messenger wire 6 itself, each wedge 8a, 8b increases the tightening force on the messenger wire 6.

Therefore, thanks to the presence of the wedges 8a, 8b the more the messenger wire 6 pulls each wedge 8a, 8b, the more each wedge 8a, 8b tightens the messenger wire 6.

Each wedges 8a, 8b comprises a bottom threaded part 14 for increasing the grip to the messenger wire 6.

Advantageously, each tapered region 12a, 12b comprises, along the longitudinal axis X of the groove 4, a proximal end 22 oriented towards a central portion of the groove 4 and a distal end 24 oriented away from said central portion of the groove 4. Each tapered region 12a, 12b further comprises a compression portion placed between a maintaining part 26 of the corresponding wedge 8a, 8b and its distal end, the width of said compression portion measured perpendicularly to the longitudinal axis X of the groove 4 being lower than a maximal width of the maintaining part.

Advantageously, the width of the compression portion measured perpendicularly to the longitudinal axis X is lower than a predetermined minimal width of the maintaining part. Preferably, said predetermined minimal width is a minimal width of the wedge 8a, 8b.

Advantageously, the wedges 8a, 8b have a length, measured along the longitudinal axis X, lower than a length of the corresponding tapered region 12a, 12b measured along said longitudinal axis X.

Figure 2:
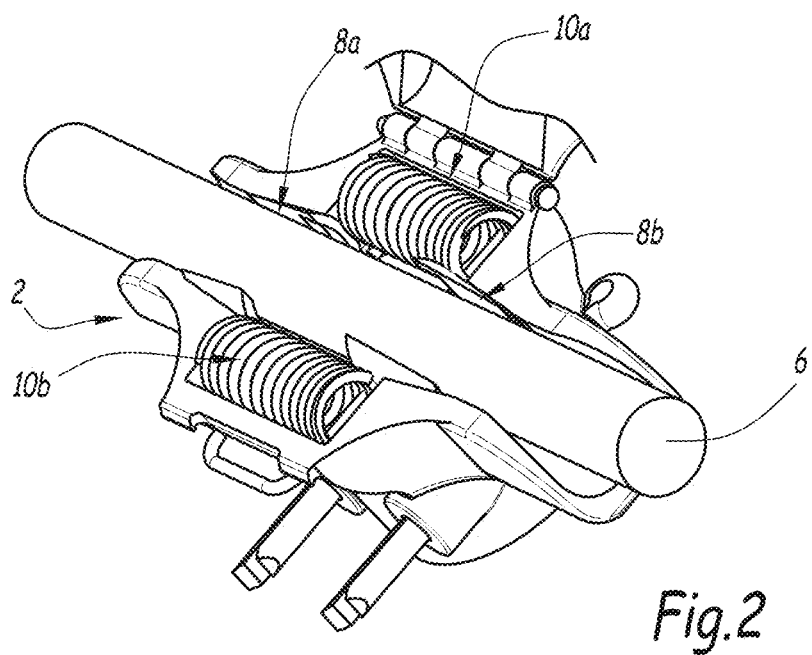
FIG. 2 shows a further perspective view of the clamp of FIG. 1.

FIG. 2 shows a further perspective view of the clamp 1 wherein the messenger wire 6 is fully inserted into the clamp 1.

Figure 3:
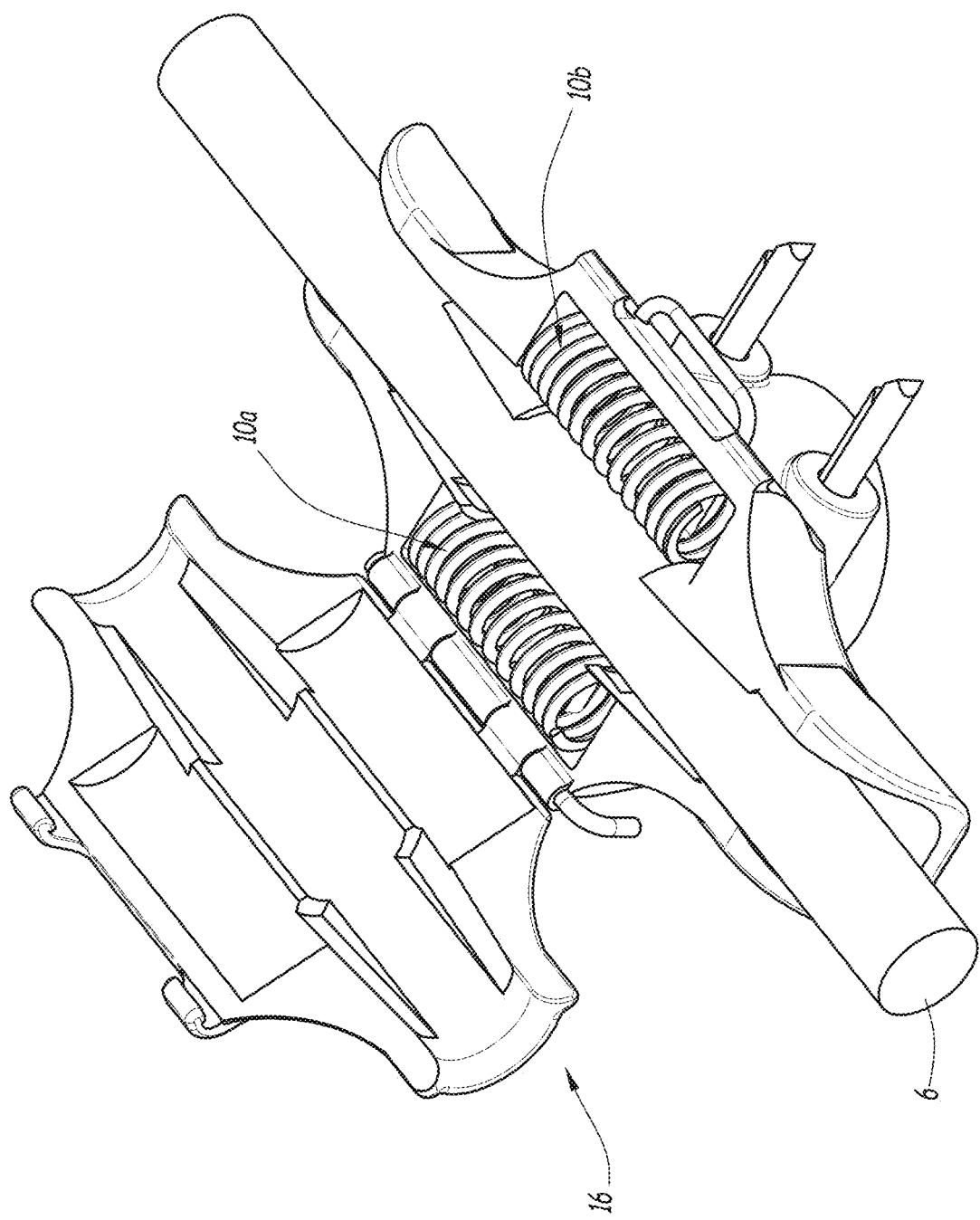
FIG. 3 shows a further top view of the clamp 1 further including a cover.

FIG. 3 shows a further top view of the clamp 1 further including a cover 16 of the clamp 1 arranged for covering the main body 2.

Figure 4:
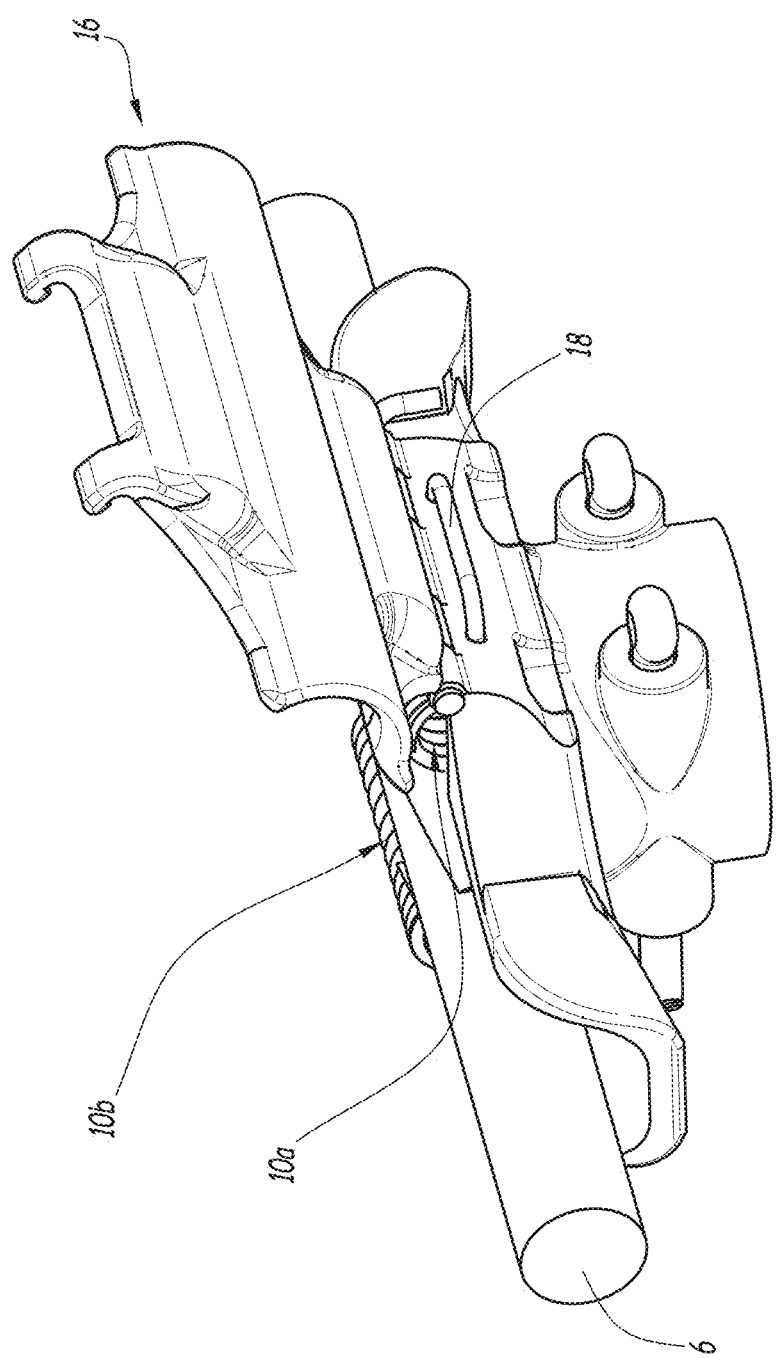
FIG. 4 shows a perspective posterior view of the clamp including a safety plug.

FIG. 4 shows a perspective posterior view of the clamp 1 further including a safety plug 18, located in the main body 2, arranged to keep the springs 10a, 10b in a compressed position wherein they do not push the respective wedges 8a, 8b into the tapered regions 12a, 12b. In order to make the springs 10a, 10b push the wedges 8a, 8b, thus tightening the messenger wire 6, the operator need to remove such safety plug 18, as detailed herein below.

Preferably, the safety plug 18 has a U shape.

Figure 5:
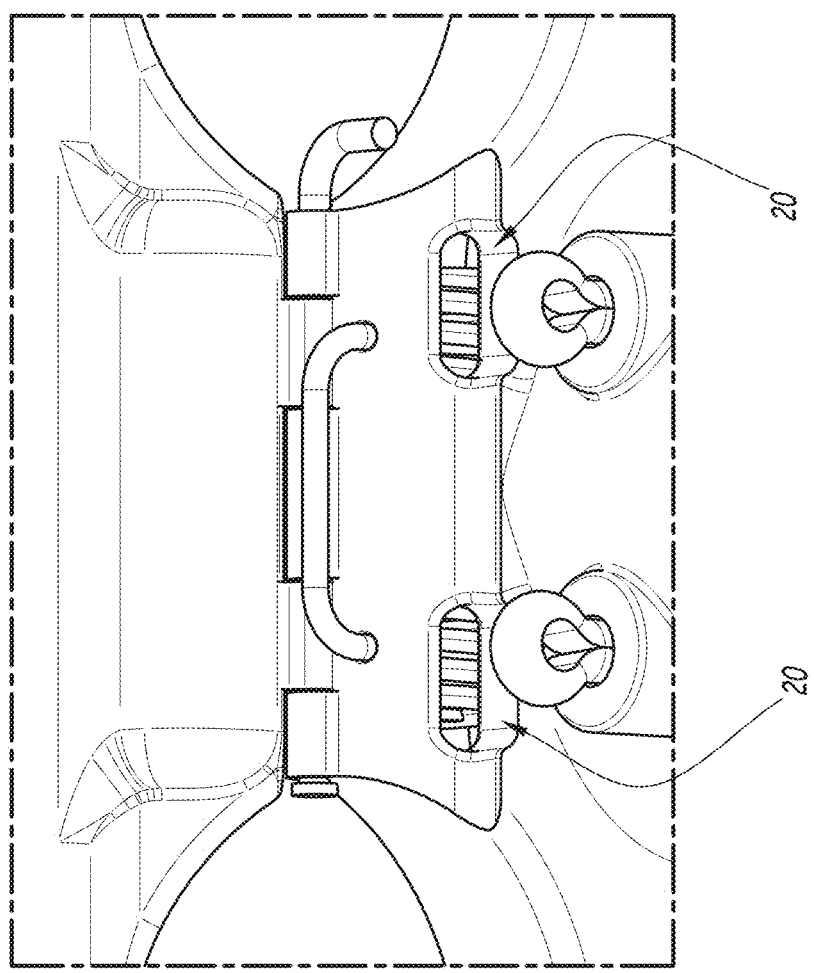
FIG. 5 is an enlarged posterior view of the clamp.

If the operator, after having tightened the messenger wire 6, needs to free it, he has to insert a special clamp, i.e. a specific tool, into two holes 20. FIG. 5 shows an enlarged posterior view of the clamp 1. The holes 20 permit an easy access to the area of the springs 10a, 10b in order to compress them and then to move back the wedges 8a, 8b to free the messenger wire 6.

Figure 6:
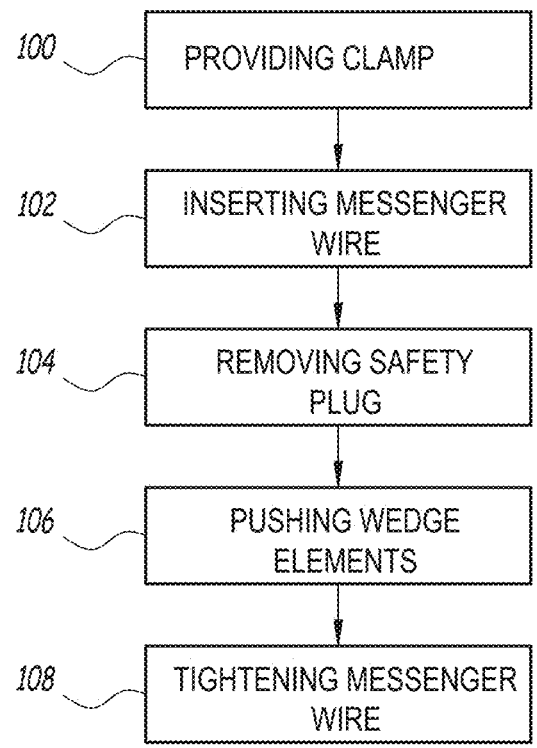
FIG. 6 shows a block diagram of the steps of a method for tightening a messenger wire according to the present invention.

FIG. 6 shows a block diagram of the steps of a method for tightening a messenger wire of an overhead line according to the present invention.

In a first step 100 a clamp 1 as above disclosed is provided. The springs 10a, 10b are in a compressed state due to the presence of the safety plug 18.

After the compression, the messenger wire 6 is inserted, in a step 102, into the groove 4.

At this point, in a step 104, the safety plug 18 is removed from its seat so that each spring 10a, 10b can push, in a step 106, the respective wedge 8a, 8b in the respective tapered region 12a, 12b.

Finally, in a step 108, each wedge 8a, 8b tighten the messenger wire 6 as above disclosed.

Figure 7:
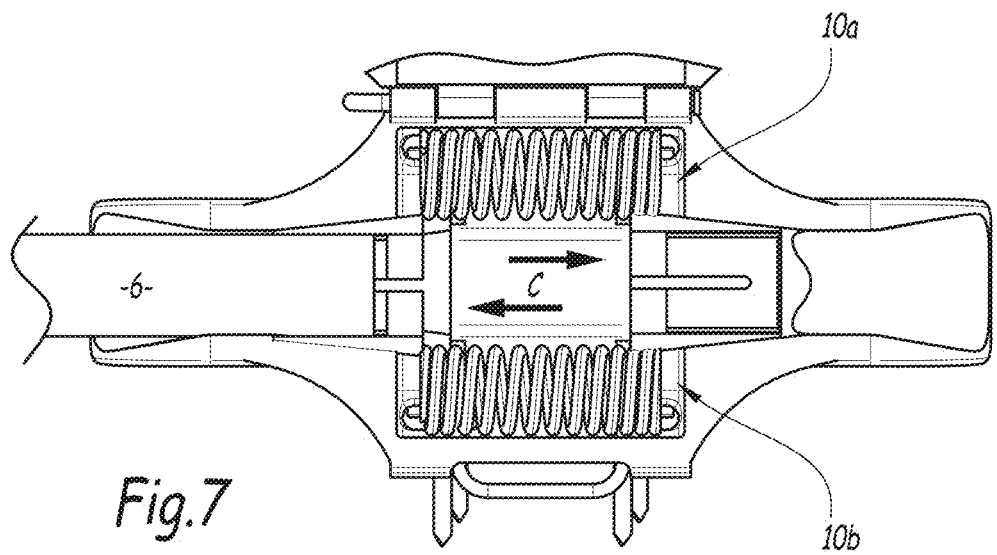
FIG. 7 shows a top view of a portion of the clamp showing the compression forces.

FIG. 7 shows a top view of a portion of the clamp 1 wherein it is shown how the springs 10a, 10b produce respective compression forces, indicated by arrows C, on the associated wedges 8a, 8b.

The fact that each wedges 8a, 8b is in the respective tapered regions 12a, 12b makes the tightening forces on the messenger wire 6 resulting from the springs 12a, 12b exercising not along the longitudinal axis X of the clamp 1 but perpendicularly to such longitudinal axis X, so the more the messenger wire 6 and the spring 10a, 10b pulls/pushes the wedge 8a, 8b, the more the wedge 8a, 8b tightens the messenger wire 6, because the wedge 8a, 8b can only follow the direction of the tapered region 12a, 12b.

Advantageously, the walls of the tapered regions 12a, 12b and the ones of the wedges 8a, 8b are configured so that when the force exerted by the walls on the wedges 8a, 8b increases, due to the movement of the wedges 8a, 8b in the tapered regions 12a, 12b, which comes from the pulling effort of the messenger wire 6 and the pushing effort of the springs 10a, 10b exercised on the wedges 8a, 8b, the width of the wedges 8a, 8b reduces, thus the tightening force on the messenger wire 6 increases.

Figure 8:
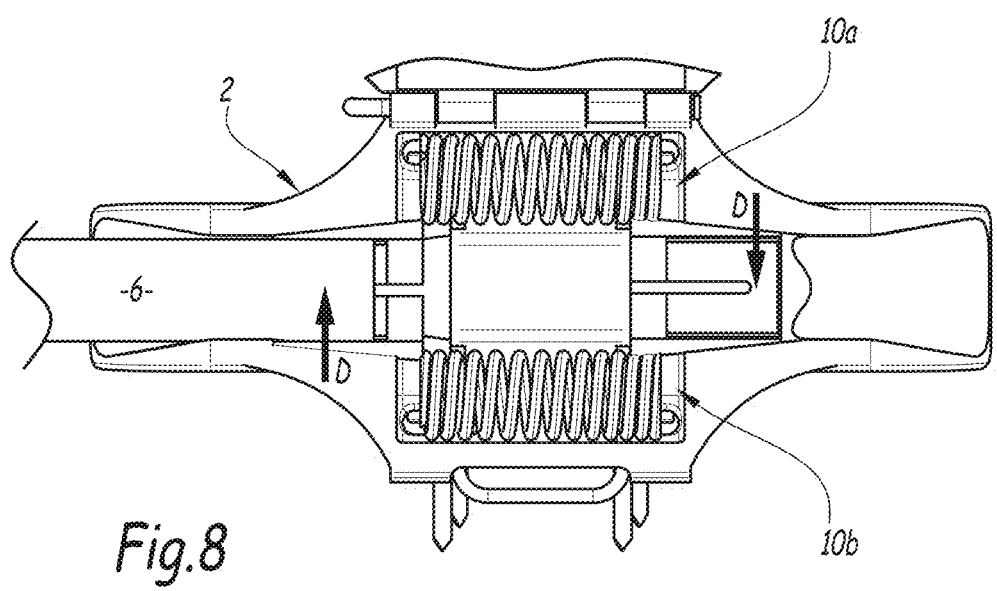
FIG. 8 shows a top view of a portion of the clamp showing the tightening forces.

FIG. 8 shows a top view of a portion of the clamp 1 wherein the tightening forces are indicated by arrows D.

The main advantages of the clamp 1 of the present invention are:

reduced time of set up during tightening the messenger wire 6;

increase safety for the operator during the clamp installation phase;

plug and play system due to the presence of the safety plug 18;

no impact on the infrastructure of the overhead line;

Thanks to the clamp 1 of the present invention, the operator has to perform the following operations:

installing the cantilevers on the support structure of the overhead line;

insert the messenger wire 6 in all the clamps of all the cantilevers;

tensioning the messenger wire 6;

returning to each clamp and removing the safety plug 18.

This last operation is easier and speeder than the corresponding one of the prior art solution, i.e. screwing each clamps.

Clearly, the principle of the invention remaining the same, the embodiments and the details of production can be varied considerably from what has been described and illustrated purely by way of non-limiting example, without departing from the scope of protection of the present invention as defined by the attached claims.

What is claimed is:

1. A clamp configured to hold a wire of an overhead line comprising:

a main body having a groove for hosting the wire, said main body comprising a first and a second tapered region located in respective ends of the groove; and a first and a second spring arranged for pushing respective first and second wedges into the tapered regions in opposite directions, said wedges being arranged for tightening the wire by blocking between the wire itself and a wall of the respective first and second tapered region, wherein the first and the second spring are parallel to each other and each wedge is pushed by both the first and the second spring, with the proviso that the first and second wedges are the only wedges arranged for tightening the wire, and wherein the first and the second spring are arranged symmetrically on both sides of the wire.

2. The clamp according to claim 1, wherein each wedge comprises a bottom threaded part for increasing the grip to the wire.

3. The clamp according to claim 1, further including a cover arranged for covering the main body.

4. The clamp according to claim 1, further including a removable safety plug located in a posterior side of the main body and arranged to keep the springs in an compressed position wherein they do not push the respective wedge into the tapered regions.

5. The clamp according to claim 1, further comprising holes arranged to permit an access at an area comprising the springs via a predetermined tool in order to compress the springs and to free the wire.

6. The clamp according to claim 1, wherein the wedges have a tapered shape complementary to the shape of a part of the corresponding tapered region in which they are received.

7. The clamp according to claim 1, wherein each tapered region comprises, along a longitudinal axis of the groove, a proximal end oriented towards a central portion of the groove and a distal end oriented away from said central portion of the groove, and wherein each tapered region comprises a compression portion placed between a maintaining part of the corresponding wedge and its distal end, the width of said compression portion measured perpendicularly to the longitudinal axis of the groove being lower than a maximal width of the maintaining part.

8. The clamp according to claim 1, wherein each tapered region comprises, along a longitudinal axis of the groove, a proximal end oriented towards a central portion of the groove and a distal end oriented away from said central portion of the groove, wherein each tapered region comprises a compression portion placed between a maintaining part of the corresponding wedge and its distal end, and wherein the width of the compression portion measured perpendicularly to the longitudinal axis of the groove is lower than a predetermined minimal width of the maintaining part.

9. The clamp according to claim 1, wherein each tapered region comprises, along a longitudinal axis of the groove, a proximal end oriented towards a central portion of the groove and a distal end oriented away from said central portion of the groove, and wherein each tapered region comprises a compression portion placed between a maintaining part of the corresponding wedge element and its distal end the width of the compression portion measured perpendicularly to the longitudinal axis of the groove being lower than a predetermined minimal width of the maintaining part being a minimal width of the wedge.

10. The clamp according to claim 7, wherein the wedges have a length, measured along the longitudinal axis of the groove, lower than a length of the corresponding tapered region measured according to said longitudinal axis.

11. The clamp according to claim 4, wherein the removable safety plug has a U shape.

\* \* \* \* \*